(12) United States Patent
Bleumer

(10) Patent No.: US 7,162,639 B1
(45) Date of Patent: *Jan. 9, 2007

(54) METHOD FOR GENERATING MANY-TIME RESTRICTIVE BLIND SIGNATURES

(75) Inventor: Gerritt Bleumer, Velten (DE)

(73) Assignee: AT & T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/216,671

(22) Filed: Aug. 31, 2005

Related U.S. Application Data

(63) Continuation of application No. 09/694,779, filed on Oct. 24, 2000, now Pat. No. 6,959,388.

(60) Provisional application No. 60/161,062, filed on Oct. 25, 1999.

(51) Int. Cl.
H04L 9/00 (2006.01)

(52) U.S. Cl. .................. 713/180; 713/176; 380/28; 380/44; 705/66; 705/74; 705/94; 726/10; 726/19

(58) Field of Classification Search ............... 380/28, 380/44; 705/66, 74, 94; 713/176, 180; 726/10, 19
See application file for complete search history.

(56) References Cited

U.S. PATENT DOCUMENTS

| | | | |
|---|---|---|---|
| 4,914,698 A | * | 4/1990 | Chaum .................. 380/30 |
| 4,926,480 A | | 5/1990 | Chaum .................. 380/23 |
| 4,949,380 A | * | 8/1990 | Chaum .................. 380/30 |

OTHER PUBLICATIONS

FORM PTO-1449, filed Oct. 23, 2000; pp. 1-3.
Form PTO-1449, filed on Oct. 23, 2000; pp. 1.

Matt Blaze, Gerrit Bleumer, Martin Strauss: Divertible Protocols and Atomic Proxy Cryptography; Eurocrypt '98, LNCS 1403, Springer-Verlag, Berlin 1998, 127-144.

Gerrit Bleumer: Biometric yet Privacy Protecting Person Authentication; Information Hiding Workshop '98, LNCS 1525, Springer-Verlag, Berlin 1998, 101-112.

Stefan Brands: An Efficient Off-line Electronic Cash System Based On The Representation Problem; Centrum voor Wiskunde en Informatica, Computer Science/Departement of Algorithmics and Architecture, Report CS-R9323, Mar. 1993.

Stefan Brands: Untraceable Off-line Cash in Wallet with Observers; Crypto '93, LNCS 773, Springer-Verlag, Berlin 1994, 302-318.

Ernest Brickell, Peter Gemmell, David Kravitz: Trustee-based racing Extensions to Anonymous Cash and the Making of Anonymous Change; 6th ACM-SIAM Symposium on Discrete Algorithms (SODA)1995, ACM Press, New York 1995, 457-466.

David Chaum: Blind Signature System; Crypto '83, Plenum Press, New York 1984, 153.

David Chaum: A New Paradigm for Individuals in the Information Age; 1984 IEEE Symposium on Security and Privacy, IEEE Computer Society Press, Washington 1984, 99-103.

(Continued)

*Primary Examiner*—Emmanuel L. Moise
*Assistant Examiner*—Paul Callahan

(57) ABSTRACT

A multiple use ticket generating method is disclosed which enables a recipient to obtain signatures for arbitrarily many (correctly formed) messages after only one interaction with the signer. The method provides a blind signature in a ticket, the signature having a multiple use with a built-in expiration. Then, the method develops a blinding value for the signature in a reproducible computation using a seed key substantially known only to the issuer of the ticket. The method implements a new class of signature schemes almost as efficiently as do previous one-time restrictive blind signature methods.

9 Claims, 1 Drawing Sheet

---

$$(r,s,t) \leftarrow sign(x,m)$$

(1) Choose $a,b \in_R \mathbb{Z}\mathbb{Z}_q$ such that $a + bm \neq -1 \pmod{q}$ (2) $r \leftarrow m^a g^a \bmod p$ if $r \cdot r - mx$ or $(a + bm)r + mx = 0 \bmod q$, then *repeat* from step (1).

(3) $(s,t) \leftarrow (ar\dfrac{mx-r}{(a+bm)r+mx}, m\dfrac{r-mx}{(a+bm)r+mx})$

Producing a signature

OTHER PUBLICATIONS

David Chaum: Security without Identification: Transaction Systems to make Big Brother Obsolete; Communications of the ACM 28/10 (1985)1030-1044.

David Chaum: Showing credentials without identification: Transferring signatures between unconditionally unlinkable pseudonyms; Auscrypt '90, LNCS 453, Springer-Verlag, Berlin 1990, 246-264.

David Chaum, Amos Fiat, Moni Naor: Untraceable Electronic Cash; Crypto '88, LNCS 403, Springer-Verlag, Berlin 1990, 319-327.

David Chaum, Torben Pryds Pedersen: Wallet Databases with Observers. Crypto '92, LNCS 740, Springer-Verlag, Berlin 1993, 89-105.

Jan L. Camenisch, Jean-Marc Piveteau, Markus A. Stadler: An Efficient Electronic Payment System Protecting Privacy; ESORICS 94 (Third European Symposium on Research in Computer Security), Brighton, LNCS 875, Springer-Verlag, Berlin 1994, 207-215.

Jan L. Camenisch, Jean-Marc Piveteau, Markus A. Stadler: Blind Signatures Based on the Discrete Logarithm Problem; Eurocrypt '94, LNCS 950, Springer-Verlag, Berlin 1995, 428-432.

Taher ElGamal: A Public Key Cryptosystem and a Signature Scheme Based on Discrete Logarithms; IEEE Transactions on Information Theory 31/4 (1985)469-472.

Niels Ferguson: Single Term Off-Line Coins; Eurocrypt '93, LNCS 765, Springer-Verlag, Berlin 1994, 318-328.

Amos Fiat, Adi Shamir: How to Prove Yourself: Practical Solutions to Identification and Signature Problems; Crypto 86, LNCS 263, Springer-Verlag, Berlin 1987, 186-194.

Yair Frankel, Yiannis Tsiounis, Moti Yung: "Indirect Discourse Proofs": Achieving Efficient Fair Off-Line E-cash; Asia crypt '96, LNCS 1163, Springer-Verlag, Berlin 1996, 286-300.

Matthew Franklin, Moti Yung: Secure and Efficient Off-Line Digital Money; 20th International Colloquium on Automata, Languages and Programming (ICALP), LNCS 700, Springer-Verlag, Berlin 1993, 265-276.

Shafi Goldwasser, Silvio Micali, Ronald L. Rivest: A Digital Signature Scheme Secure Against Adaptive Chosen-Message Attacks; SIAM Journal on Computing 17/2 (1988)281-308.

Andrew M. Odlyzko: Designs, Codes, and Cryptography (1999). To appear. http://www.research.att.com/amo/doc/complete.html.

David Pointcheval, Jacques Stern: Provably Secure Blind Signature Schemes; Asiacrypt '96, LNCS 1163, Springer-Verlag, Berlin 1996, 252-265.

David Pointcheval, Jacques Stern: New Blind Signatures Equivalent to Factorization; 4th ACM Conference on Computer and Communications Security, ACM-Press, New York 1997, 92-99.

Birgit Pfitzmann, Ahmad-Reza Sadeghi: Coin-Based Anonymous Finger-printing; To appear at Eurocrypt '99, Springer-Verlag, Berlin 1999.

Cristian Radu, Ren Govaerts, Joos Vandewalle: Efficient electronic cash with restricted privacy; Financial Cryptography '97, Springer-Verlag, Berlin, 57-69.

Markus Stadler, Jean-Marc Piveteau, Jan Camenisch: Fair Blind Signatures; Eurocrypt '95, LNCS 921, Springer-Verlag, Berlin 1995, 209-219.

* cited by examiner $$(r,s,t) \leftarrow \text{sign}(x,m)$$

(1) Choose $a,b \in_R ZZ_q$ such that $a + bm \neq -1 \pmod{q}$ (2) $r \leftarrow m^a g^a \bmod p$ if $r, r - mx$ or $(a+bm)r + mx = 0 \bmod q$, then *repeat* from step (1).

(3) $(s,t) \leftarrow \left( ar \dfrac{mx - r}{(a+bm)r + mx}, m \dfrac{r - mx}{a+bm)r + mx} \right)$ Fig. 1. Producing a signature $$(m',(r',s',t')) \leftarrow \text{trans}(y,m,(r,s,t),\omega)$$

| | Bob | Verifier |
|---|---|---|
| (1) | Choose $\alpha \in_R ZZ_q$ | Choose $d \in_R ZZ_q^*$ |
| (2) | $m' \leftarrow m^\omega \bmod p$ | |
| (3) | $(\beta,\gamma) \leftarrow \left( \dfrac{rt}{m+t'}, \dfrac{ms - \omega(r+s)m'}{\omega(m+t)m'} - \dfrac{\alpha}{\omega m'} \right)$ | |
| | $r^* \leftarrow m^\alpha r^\beta g^\gamma \bmod p$ | $\xrightarrow{m',r^*}$ |
| (4) | | $\xleftarrow{d}$ |
| (5) | $r' \leftarrow (r^* y)^d g^{-\frac{1}{m'}} \bmod p$ | $r' \leftarrow (r^* y)^d g^{-\frac{1}{m'}} \bmod p$ | if $dr' = 0 \pmod{q}$ then *repeat from step* (1).

(6) $(a,b) \leftarrow (\alpha d, \beta d)$ (7) $(s',t') \leftarrow \left( \dfrac{art - bms}{wrt} r' \bmod q, -m' \right) \xrightarrow{s',t'}$ accept if $\text{verify}(y,m',(r',s',t'))$ Fig. 2. Transforming a signature

METHOD FOR GENERATING MANY-TIME RESTRICTIVE BLIND SIGNATURES

This application is a continuation of U.S. patent application Ser. No. 09/694,779 filed Oct. 24, 2000 entitled METHOD FOR GENERATING MANY-TIME RESTRICTIVE BLIND SIGNATURES, now U.S. Pat. No. 6,959,388, and claims priority to U.S. Provisional Application Ser. No. 60/161,062, filed Oct. 25, 1999. The aforementioned related patent applications are herein incorporated by reference.

BACKGROUND OF THE INVENTION

Field of the Invention

The invention disclosed broadly relates to cryptography and more particularly relates to digital signature methods.

In contrast to conventional digital signature schemes, blind signature schemes allow the recipient to obtain signatures for messages that the signer does not learn. If the recipient can get only one signed message from each execution of the signing operation by the signer, then the blind signature scheme is called one-time, otherwise it is called many-time. Many-time blind signatures have been used to build untraceable tickets, called credentials. Such tickets can be issued by one organization and verified by another. Each customer uses different pseudonyms with each organization and a ticket is simply a blind signature for a customer pseudonym. The blinding property allows one to use different pseudonyms for issuing and showing a ticket. Even if all organizations collude, they cannot trace which tickets belong to which customers. One-time blind signatures have been used to build practical offline and online untraceable electronic cash schemes, where the issuing organizations are banks, the recipients are merchants and the tickets can be used only once. Most electronic cash schemes based on blind signatures use the one-time form, mainly to avoid the problem of multiple copies of the same electronic coin.

For offline untraceable electronic cash, double spending of coins should be detectable after the fact, so that double spenders are identifiable if and only if they use a coin more than once. This problem has been addressed by using restrictive one-time blind signatures. The customer's identity is embedded into her pseudonyms in such a way that it is revealed if and only if she double spends. A general blind signature scheme would allow a customer to also obtain coins for pseudonyms of other customers or for pseudonyms that are not assigned to anyone. In contrast, restrictive blind signature schemes guarantee that customers form their pseudonyms in a way that preserves the customer's identity, which the signer has encoded into each issued pseudonym.

A related application area is untraceable membership cards, which can be stored in palmtops, smartcards, etc. Owners may use their membership cards online or offline, arbitrarily often, and in an untraceable way, i.e., several uses of the same card cannot be linked by the respective verifiers. However, issuers of membership cards require that membership cards can be used only by their owners, not by other individuals, even if the owners wish to lend their membership cards away. Purely cryptographic solutions to this problem cannot exist because whether a membership card is actually used by its owner or someone else, is not distinguishable by cryptographic means. It has been suggested to use a wallet-with-observer architecture, where every user has a personal device (wallet) that is in part controlled by an implanted tamper resistant security module (observer). The observers can be equipped with a biometric sensor which is a sufficiently powerful hardware basis for the problem at hand. The prior art relies heavily on the tamper resistance of observers, because if an attacker breaks his observer he can not only lend his own membership cards to other individuals, but he can also forge new membership cards. Another approach relies on the tamper resistance of only observers with respect to transferability of membership cards. Attackers who break their observers can at most pool all the membership cards they already have, but cannot produce new ones. The approach includes a "cascade" signature scheme which has not been implemented.

What is needed in the prior art is a restrictive blind signature scheme that allows a recipient to obtain signatures for arbitrarily many (correctly formed) messages after only one interaction with the signer.

SUMMARY OF THE INVENTION

A multiple use ticket generating method is disclosed which enables a recipient to obtain signatures for arbitrarily many (correctly formed) messages after only one interaction with the signer. The method provides a blind signature in a ticket, the signature having a multiple use with a built-in expiration. Then, the method develops a blinding value for the signature in a reproducible computation using a seed key substantially known only to the issuer of the ticket. The method implements a new class of man-time restrictive blind signature schemes almost as efficiently as do previous one-time restrictive blind signature methods.

The resulting ticket can be in the form of an electronic personal ticket, such as a season ticket for sporting events. Other forms for the ticket can include a personal license, such as a personal driver's license. The ticket has the property of being untraceable and has the advantage that the signature does not require an interactive signing protocol.

DESCRIPTION OF THE FIGURES

FIG. 1 shows a method for producing a signature.

FIG. 2 shows a method for transforming a signature.

DESCRIPTION OF THE PREFERRED EMBODIMENTS

An efficient implementation of a many-time restrictive blind signature scheme is disclosed. It uses no hash function, is about as efficient as previous one-time restrictive blind signature methods, and its security rests on a similar assumption as that of the ElGamal signature scheme. Applications for the new signature scheme are untraceable offline personal tickets, e.g., monthly season tickets, driver's licenses, or coupons that can be used multiple times until they expire. A computer system for carrying out the method of the invention is a standard general purpose data processor that includes a random access memory to store the program embodiment of the invention and a central processor to execute the instructions in the program embodiment. The computer system is connected to a network to generate and circulate untraceable tickets, licenses, or coupons that can be used multiple times until they expire.

Definitions

A definition follows of many-time restrictive blind signatures. The formalization of restrictiveness follows ideas of Brands [B93], Franklin and Yung [FY93] and Pfitzmann and Sadeghi [PS99].

Definition 1 (Many-time restrictive blind signature).

A many-time restrictive blind signature scheme consists of a security parameter k∈IN, a signing key space X, a verifying key space Y, a message space M, a signature space Σ, a blinder space Ω, a witness space W, and a relation make ⊆M×W. Also included is an equivalence relation on W (equivalent witnesses v, w∈W are denoted v≡w), more precisely, there are families of all these domains indexed by the security parameter k. If (w, m)∈ make then we say that witness w makes message m. At system setup time, a particular security parameter is chosen and from then on, only one instance of each domain is used. Also included are two probabilistic protocol algorithms gen, sign, a probabilistic protocol trans of two participants Bob and Verifier, and a deterministic algorithm verify, which are declared as follows:

$$(x, y) \leftarrow gen(k) \qquad \sigma \leftarrow sign(x, m)$$

$$(m', \sigma') \leftarrow trans(y, m, \sigma, w) \qquad acc \leftarrow verify(y, m, \sigma).$$

All of them are efficiently computable. Given a security parameter k, the key generating algorithm gen returns a pair of a private signing key x∈X and a public verification key y∈Y. The algorithm sign takes as input a signing key x∈X and a message m∈M. It returns a signature σ∈Σ. The protocol trans takes as input for both Bob and the Verifier a verification key y, and only for Bob a message m, a signature σ and a blinder ω. After the protocol, both Bob and the Verifier return the same message m' and signature σ'. The algorithm verify takes as input a public key y, a message m∈M and a signature σ∈Σ and returns a Boolean value acc. If verify (y, m, σ) returns True then the signature σ is called valid for m with respect to public key y, or the pair (m, σ) is valid for y.

EFFECTIVENESS: For every security parameter k, every key pair (x, y)←gen(k), and every message m∈M the algorithm sign (x, m) produces a valid signature σ for m. For all inputs as above, every blinder ω∈Ω and every signature σ∈Σ valid for m the algorithm trans (y, m, σ, ω) returns a valid signature σ' for m'.

RESTRICTIVENESS with respect to make and ≡: Every polynomial-time attacker who (i) obtains valid signatures $\sigma_i$ (i=0 . . . n) from the signer for respective messages $m_i$ of his (adaptive) choice. The choice of each message he asks to be signed may depend on all messages previously chosen and the corresponding responses by the signer. The attacker also (ii) comes up with a new message m' and signature σ' and (iii) delivers n+1 witnesses $\omega_1, \omega_2, \ldots, \omega_n$, ω' has only a negligible chance of achieving the following event: The signature σ' is valid for m', the witnesses $\omega_i$, ω' each match their messages $m_i$, m' and the witness ω' is not equivalent to any of the witnesses $\omega_i$ if any.

UNLINKABILITY: Let (m, σ), (m', σ') be two pairs valid with respect to y. Then for each internal choice $r_V$ of the Verifier in trans, there is a unique blinder ω∈Ω and a unique internal choice, (i.e., a sequence of random bits used by a probabilistic algorithm) $r_B$ for Bob in algorithm trans, such that the execution of trans (y, m, σ, ω) with internal choices $r_B$, $r_V$ returns (m', σ').

Note that previous one-time blind signature schemes use an interactive signing protocol from which the recipient gets a message and $_{signature}$ that he can later show to a verifier without interaction. Many-time blind signature schemes use a non-interactive signing protocol from which the recipient gets a message and signature that he can later transform and thereby show to many verifiers.

3 The Rust Signature Scheme

The proposed many-time blind signature scheme is referred to herien as "RUST". The standard discrete log setting is adopted. Let p be a large prime, q be a large prime divisor of p−1. Typically, p and q will be chosen about 1024 bit and 160 bit long, respectively [O99]. Then $Z_p^*$ has a unique subgroup $G_q$ of order q and since $Z_p^*$ is cyclic, so is $G_q$. Let g, $g_1$ be generators of $G_q$ that are chosen uniformly at random.

The private and public key spaces are $ZZ_q$ and $G_q$, respectively. The message space is $M=G_{q^*\setminus\{1\}}$, where $G_q^*$ is $G_q$ except all members that disappear modulo q. The signature space is $\Sigma=G_q^* \times ZZ_q \times ZZ_q^*$, the space of blinders is $\Omega=ZZ_q^*$, the witness space is W=ZZq, the making relation is $$\text{make}=\{(m,\omega)\in M \times W | m = g_1^\omega \bmod p\}$$

and any two witnesses are equivalent, i.e., ∀v, w∈W: v≡w. Key generation is by choosing a signing key $x \in X_{uniformly}$ at random and computing the corresponding verification key $y=g^x \bmod p$.

A signature (r, s, t)∈Σ (thus the name of the scheme) is valid for message m∈M with respect to public key y if the following $_{equation}$ holds:

$$\text{verify}(y,m,\sigma)=g^{r+s}=y^{m+t}m^{ms}r^{rt} \bmod p. \qquad (1)$$

A pair (m, σ) is called terminated if t=−m mod q, otherwise it is called fresh.

3.1 Producing Signatures

Let the generator g, and a key pair (x, y) be setup as above. A signature for a given message m∈M is constructed as shown in FIG. 1:

One chooses a, $b \in_R ZZ_q$ uniformly at random such that a+bm≠−1(mod q) in step (1) and computes the signature component r in step (2). If any of the values r, r−mx or (a+bm) rmx disappears modulo q, then the execution needs to be repeated from step (1). In step (3), the remaining signature values s, t are computed.

3.2 Transforming Signatures

Given a verification key y and a blinder ω∈Ω, a fresh pair (m, (r, s, t))∈M×Σ of a message and a signature is transformed into another pair (m', (r', s', t')). The blinder ω is required such that $m^\omega \bmod p \neq 0 \pmod q$ (see FIG. 2): In step (1) through (5) Bob forms the new message m' and the signature component $r'=m^a r^b g^c y^d$ such that:

1. the exponents $$b = \frac{rt}{m+t}d \text{ and } c = \frac{a}{\omega m'} + d\frac{ms - \omega(r+s)m'}{\omega(m+t)m'} - \frac{1}{m'}$$

are functions of a and d, 2. the Verifier does not learn any information about Bob's input m, (r, s, t), 3. even if Bob deviated from the protocol, he could not end up with some r' for which he has a representation with respect to m, r, g only, i.e., d=0.

In detail, Bob chooses uniformly at random an auxiliary value $\alpha \in_R ZZq$, and the Verifier chooses $d \in_R ZZq$ (step (1)). Then Bob computes the output message $m'=m^\omega \bmod p$ in step (2). Bob further computes the auxiliary values (β, γ) and the preliminary signature component r* in step (3). After sending m', r* to the Verifier, he obtains in return the Verifier's choice d in order to compute the signature component r' in step (5). So does the Verifier. Only in the case if d or r' disappears modulo q must the protocol be repeated from step (1). Next, Bob computes the exponents a, b according to step (6) and the signature components s', t' according to step (7). He finally sends the signature components s', t' to the Verifier. FIG. 2 illustrates transforming a signature.

Remark 2. The RUST signature scheme ensures that signers always produce fresh pairs of messages and signatures and that only fresh pairs can be transformed. Note that if t=−m mod q some quotients in trans were undefined. However, transformed pairs are always terminated, so that a Verifier cannot transform a pair further. This feature of RUST is not implied by restrictiveness (Definition 1).

The protocol trans can be made non-interactive if one is willing to rely on the obscurity of some hash function H as in the standard Fiat-Shamir technique [FS87]: Instead of sending m', r* after step (3) and obtaining the Verifiers choice d in return, Bob can compute d=H(y, m', r*) after step (3) by himself. After step (7), Bob then sends m', r*, s', t' to the Verifier. Finally, the Verifier checks in addition to the verification equation (1) whether $r'=(r^*y)^{H(y, m', r^*)} g^{-1/m'}$.

The witness equivalence used for the RUST signature scheme is degenerate in the sense that any two witnesses are equivalent. This is no weakness of the RUST signature scheme, but allows producing and transforming signatures quite efficiently. Note that Brands suggests to use his one-time restrictive blind signature scheme for off line e-cash [B93] with the same degenerate witness equivalence (and function make). In offline e-cash, the price for the increased performance is computational instead of unconditional non-frameability. For many-time restrictive blind signatures, like the RUST scheme, signer identification by (more than one) signatures is no issue, and thus framing of signers is no issue either.

4. Main Result

In order to analyze the security of a proposed many-time restrictive blind signature scheme, referr to here as RUST, one needs the following two assumptions. These assumptions are not among the intensely investigated complexity theoretic assumptions like the discrete logarithm assumption [MOV97]. Nevertheless, they also underlie for example the ElGamal signature scheme and its derivatives without having been made explicit in previous work.

Assumption 1.

For some natural number n∈IN, let $g_i$ (i∈[1, n]) be generators of $G_q$, and define the function $$F_{g_1, g_2, \ldots, g_n}(x_1, x_2, \ldots, x_n) = \prod_{i=n}^{n} g_i^{x_i} \mod p$$

that takes arguments $x=(x_1, x_2, \ldots, x_n) \in ZZ_q^n \setminus \{(0, 0, \ldots, 0)\}$. Then the function $$F_{g_1, g_2, \ldots, g_n}(x) \mod q$$

is an implementation of a random oracle [BR93]. (Note the difference of the moduli p and q!)

Assumption 2.

If at all, a polynomial-time attacker A can compute valid pairs of messages and signatures with respect to a given verification key y, but then only as follows:
  First pick a set of n≧1 generators $h_1, \ldots, h_n$ of $G_q$, choose tuples a, b∈$ZZ_q^n$,
  form the message $m'=F_{h_1, \ldots, h_n}(a)$ and the signature component $r'=F_{h_1, \ldots, h_n}(b)$,
  and finally compute the signature components s', t'.

Without loss of generality, the attacker can be assumed to pick the generators $h_1, \ldots, h_n$ such that he cannot feasibly find a representation of 1 with respect to $h_1, \ldots, h_n$ in $G_q$. Otherwise, he could represent at least one of the generators with respect to the others, and thus he could pick a proper subset of $\{h_1, \ldots, h_n\}$ in the first step above, adapt the following steps accordingly and end up with the same result (m', (r', s', t')).

A similar assumption has been used to reason about the security of ElGamal signatures [EG85], but those assumptions were left implicit.

Theorem 3. Under assumptions A1 and A2, RUST is a many-time restrictive blind signature scheme.

Proof. Check effectiveness, restrictiveness and blindness in turn.

Effectiveness of sign: Under Assumption A1, the probability to make a choice a, b∈$ZZ_q$ such that any of the values r, r−mx or $D \stackrel{def}{=} (a+bm)r+mx$ disappears modulo q is negligible and so is the probability to repeat step (2) of algorithm sign. In order to verify algorithm sign (see FIG. 1), insert its output into the right hand side of verification equation (1):

$$\begin{aligned}
y^{m+t} m^{ms} r^{rt} &= g^{x(m+t)} m^{ms} (m^a g^b)^{rt} \\
&= g^{x(m+m\frac{r-mx}{D})} m^{\frac{amr}{D}(mx-r)} m^{\frac{amr}{D}(r-mx)} g^{\frac{bmr}{D}(r-mx)} \\
&= g^{\frac{mx}{D}((a+bm)r+mx+r-mx)} g^{\frac{bmr}{D}(r-mx)} \\
&= g^{\frac{mrx}{D}(a+bm+1)+\frac{mr}{D}(br-bmx)} \\
&= g^{\frac{mr}{D}(ax+x+br)} \\
&= g^{\frac{r}{D}(ar+amx+mx+bmr-ar)} \\
&= g^{\frac{r}{D}(D+amx-ar)} \\
&= g^{r+\frac{ar}{D}(mx-r)} \\
&= g^{r+s} \pmod{p}.
\end{aligned}$$

The signer produces fresh signatures because he chooses $$t = m \frac{r-mx}{(a+bm)r+mx} \neq m(-1) = -m \; (mod \; q)$$

according to the condition a≠bm+1 mod q in step (1) of FIG. 1. The signature components r and t do not disappear modulo q because of the loop condition in step (2).

Effectiveness of trans: The following verification is prepared by expressing Bob's signature components r' and s' in terms of Bobs input and his internal choices α, d and by using the definitions of β and γ according to step (3) of FIG. 2:

$$r' = (r*y)^d g^{\frac{-1}{m'}} = (m^\alpha r^\beta g^\gamma y)^d g^{\frac{-1}{m'}} = m^{\alpha d} r^{\frac{rt}{m+t}} d g^{\frac{ms-\omega(r+s)m'}{\omega(m+t)m'}d - \frac{\alpha d}{\omega m'} - \frac{1}{m'}} y^d \quad (2)$$

$$s' = \frac{art - bms}{\omega rt} r' = \frac{r'}{\omega rt}\left(\alpha drt - \frac{rt}{m+t}dms\right) = d\frac{r'}{\omega}\left(\alpha - \frac{ms}{m+t}\right). \quad (3)$$

Under Assumption A1, the probability of choosing $a \in ZZ_q$, $d \in ZZ_q^*$ such that $r'=0 \mod q$ is negligible, and so is the probability of repeating after step (5). Next, insert the output $m'$, ($r'$, $s'$, $t'$) of algorithm trans into the verification equation (1) and by inserting the expressions for $m'=m^\omega$ and $r'$ according to equation (2):

$$y^{m'+t'}m'^{m's'} = m^{\omega m'\frac{art-bms}{\omega rt}}\left(m^{\alpha d}r^{\frac{rt}{m+t}}d g^{\frac{ms-\omega(r+s)m'}{\omega(m+t)m'}d - \frac{\alpha d}{\omega m'} - \frac{1}{m'}} y^d\right)^{-r'm'}$$

$$= m^{\omega m'\frac{r'}{\omega}\left(\alpha d - \frac{dms}{m+t}\right)}\left(m^{\alpha d}r^{\frac{rt}{m+t}}d g^{\frac{-\omega(r+s)m'}{\omega(m+t)m'}d} y^d\right)^{-m'r'} g^{\left(\frac{(ms)}{\omega(m+t)m'}d - \frac{\alpha d}{\omega m'} - \frac{1}{m'}\right)(-m'r')}$$

$$= m^{\left(\alpha d - \frac{dms}{m+y}\right)m'r'}\left(m^{\alpha d}r^{\frac{rt}{m+t}}d g^{\frac{r+s}{m+t}}d y^d\right)^{-m'r'} g^{\left(\frac{\alpha d}{\omega} - \frac{dms}{\omega(m+1)}+l\right)r'}$$

$$= \underbrace{(m^{ms}r^{rt}g^{-(r+s)}y^{m+t})^{-d\frac{m'r'}{m+t}}}_{=1} g^{r'+\frac{dr'}{\omega}\left(\alpha - \frac{ms}{m+t}\right)} = g^{r'+s''} \pmod p.$$

For the final rewriting use the expression (3) for $s'$. According to step (7) of FIG. 2, Bob produces terminated pairs because $t'=-m'$. This guarantees $t' \neq 0 \mod q$ because $m'$ is presumed not to disappear modulo q. The signature component $r'$ does not disappear modulo q because of the loop condition in step (5).

Restrictiveness: First consider private key related attacks. Consider a polynomial-time attacker who has obtained $n \in IN$ valid pairs ($m_i$, ($r_i$, $s_i$, $t_i$)) of messages and signatures for $i=1, \ldots, n$ from the signer. The signer has chosen $r_i = m_i^{a_i} g_i^{b_i} \mod p$, and has computed the signature components $s_i$, $t_i$ according to FIG. 1. The signature components $r_i$ release no information about the choices $a_i$, $b_i$ to a polynomial-time attacker, so we need to look only at $s_i$ and $t_i$. According to FIG. 1, $$s_i = \frac{a_i r_i}{m_i} t_i,$$

which reveals the signer's choices $a_i$. From the $t_i$, the attacker learns the following system (4) of n linear equations over ZZq in n+1 variables, namely $b_i$, x for $i=1, \ldots, n$:

$$m_i(r_i - m_i x) = t_i(a_i r_i + b_i m_i r_i + m_i x) \Leftrightarrow b_i m_i r_i t_i + m_i x(t_i + m_i) \quad (4)$$
$$= m_i r_i - a_i r_i t_i.$$

The values x and $b_i$ are undetermined because $t_i$, $m_i \neq 0$, and therefore valid signatures release no more information about $x = \log_g y$ to a polynomial-time attacker, than y itself.

Next, show that an attacker who has not received any valid RUST signature with respect to a public key y cannot feasibly fabricate a valid signature for any message on his own (Case 0). An attacker who has got valid signatures for one or more messages $m_i$ is considered afterwards (Case 1).

Case 0: By contradiction to restrictiveness (Definition 1), assume an attacker who has no valid pairs of messages and signatures in the first place (n=0 in Definition 1), but succeeds to come up with a message m for which he has a witness $\omega \in \Omega$ that makes m, i.e., $m = g_1^w$ and a valid signature σ. (For lack of input pairs to trans, plain identifiers are used for the outputs, i.e., no primes.) According to Assumption A2, the attacker uses 3 parameters a, c, $d \in ZZ_q$ in order to build the signature component:

$$r = m^{a'} g^{c'} y^{d'} \mod p$$

Because m must be chosen to be $g_1^w$, the only elements of $G_q$ an attacker might use successfully to build r are those occurring in the verification equation (1), namely m, g, y. Would he use any other independently chosen element $h \in G_q$ and succeed to find a valid signature, then the verification equation would reveal a representation of h with respect to m, g, y, which contradicts the discrete logarithm assumption.

Inserting the expression for r into the verification equation (1) yields:

$$g^{r+s} = y^{m+t}m^{ms}r^{rt} = y^{m+t}m^{ms}(m^{a'}g^{c'}y^{d'})^{rt} = y^{m+t}g_1^{\omega ms}$$
$$(g_1^{\omega a'}g^{c'}y^{d'})^{rt},$$

which can be rewritten as:

$$g^{r+s-c'rt} = y^{m+t+d'rt}g_1^{\omega(ns+a'rt)}.$$

Since the bases g, y and $g_1$ are chosen independently, the only feasible way for the attacker to solve (5) is by letting the exponents of g, y and $g_1$ disappear.

This leads to the following linear system (6) of 3 equations in 2 variables s and t, over ZZq:

$$\omega ms + \omega a'rt = 0 - s + c'rt = r + (d'r+1)t = -m \quad (6)$$

This system can be solvable only if the corresponding 3×3 determinant disappears:

$$\begin{vmatrix} \omega m & \omega a'r & 0 \\ -1 & c'r & r \\ 0 & d'r+1 & -m \end{vmatrix} = ((1+a'+c'm)+d'r)\omega mr = 0 \quad (7)$$

Since neither ω nor m nor r may disappear modulo q, this condition (7) can be met only if $(1+a'+c'm)+d'r$ 32 0. Here, the factors m and r are determined only after (o respective a', c', d' have been chosen, and by Assumption A1, neither m nor r can be predicted or coerced to any particular value. Hence the only way to let the determinant (7) disappear is to let $1+a'+c'm=d'=0 \pmod q$. However, protocol trans ensures with overwhelming probability that a dishonest Bob ends up with a representation of r whose exponent d' of y is not disappearing regardless of how Bob chooses r*. Note that Bob must provide r* before the Verifier sends his d and forms the signature component $r=(r^*y)^d g^{-1/m}$ in step (5).

Case 1: Due to the degenerate equivalence≡of witnesses, i.e., any two witnesses are equivalent, restrictiveness is satisfied whenever the attacker has obtained at least one valid pair (m, σ) and comes up with a new pair (m', σ') and a witness making m'. Restrictiveness requires no more, and thus nothing needs to be shown.

Blindness: Show that for each fresh valid pair (m, σ), where t≠−m(mod q), and each terminated valid pair (m', σ'), where t'=−m' (mod q), of messages and RUST signatures, and each choice d∈$ZZ_q^*$ of the verifier in trans, there is exactly one input ω∈$ZZ_q^*$ and one value α∈$ZZ_q^*$ such that trans maps (m, σ) to (m', σ'). (Note that the value r* of the verifier's view on Bob in trans is a one-to-one map of the other elements d, m', r' of his view, and thus from an information theoretic viewpoint, it suffices to consider d, m', σ' as the verifier's view.) In the following, all steps refer to protocol trans in FIG. 2.

First show there is at most one pair (α, ω): It is immediate from step (2) that the blinder $\omega = \log_m m'$ is uniquely determined. Furthermore, for each d∈$ZZ_q^*$ is obtained from steps (7), (6) and (3) in turn the following expression for s':

$$s' = \frac{art - bms}{\omega rt} r' = \frac{\alpha drt - \beta dms}{\omega rt} r' = \frac{\alpha rt - \frac{rt}{m+t} ms}{\omega drt} r' \pmod{q}.$$

Since all r, t, d, r', (m+t) are presumed not to disappear modulo q, the internal choice a of Bob is uniquely determined as follows:

$$\alpha = \frac{\omega s'}{dr'} + \frac{ms}{m+t} \mod q.$$

Next show that the uniquely determined pair (α, ω) from above transforms a fresh valid pair (m, σ) of message and signature into a terminated valid pair (m', σ'). Since (m, σ)=(m, (r, s, t)) is presumed a fresh valid pair, we can rewrite the verification equation (1) for (m, (r, s, t)) as follows:

$g^{r+s} = pk^{m+t} m^{ms} r^{rt} \Leftrightarrow r^{rt} = g^{r+s} pk^{-(m+t)} m^{-ms}$, where t≠−m (mod q) (9)

Furthermore, the unique a in equation (8) also determines a unique Y in step (3), namely:

$$\gamma = \frac{ms - \omega(r+s)m'}{\omega(m+t)m'} - \frac{\alpha}{\omega m'} = \frac{ms - \omega(r+s)m'}{\omega(m+t)m'} - \left(\frac{s'}{dm'r'} + \frac{ms}{\omega m'(m+t)}\right) =$$

$$-\left(\frac{r+s}{m+t} + \frac{s'}{dm'r'}\right) \pmod{q}.$$

Next, evaluate r' according to step (3) by inserting $r'^t$ from equation (9), α from equation (8), β=rt/(m+t) from step (3) and Y from equation (10):

$$r' = (r*pk)^d g^{-\frac{1}{m'}}$$

$$= (m^\alpha r^\beta g^\gamma pk)^d d^{-\frac{1}{m'}}$$

$$= m^{\alpha d} r^{\frac{rt}{m+t}} g^{\gamma d - \frac{1}{m'}} pk^d$$

-continued $$= m^{\alpha d} (g^{r+s} pk^{-(m+t)} m^{-ms})^{\frac{d}{m+t}} g^{\gamma d - \frac{1}{m'}} pk^d$$

$$= m^{\left(\frac{\omega s'}{dr'} + \frac{ms}{m+t}\right)d} (g^{r+s} m^{-ms})^{\frac{d}{m+t}} g^{-\left(\frac{r+s}{m+t} + \frac{s'}{dm'r'}\right)d - \frac{1}{m'}}$$

$$= m^{\frac{\omega s'}{r'}} g^{-\frac{s'}{m'r'} - \frac{1}{m'}}$$

$$= m'^{\frac{s'}{r'}} g^{-\frac{s'-r'}{m'r'}} \pmod{p}.$$

Finally, check that the values m', r', s', t' satisfy the verification equation (1) if r' is inserted from (11) and use t'=−m' mod q from step (7):

$$pk^{m'+t'} m'^{m's'} r'^{r't'} = pk^{m'-m'} m'^{m's'} \left(m'^{\frac{s'}{r'}} g^{-\frac{s'-r'}{m'r'}}\right)^{-r'm'} = g^{r'+s'} \pmod{p}.$$

This concludes the proof.

A restrictive blind signature scheme has been presented that allows a recipient to obtain signatures for arbitrarily many (correctly formed) messages after only one interaction with the signer. Signing, transforming and verifying costs two, six, and six full length modular exponentiations, respectively. For transforming and verifying, count the exponentiations of Bob and of the Verifier in trans, respectively. This compares to two, five and four modular exponentiations of the signer and recipient during the signing protocol and verification of the one-time restrictive blind signature protocol proposed by Chaum, Pedersen [CP92] and later by Brands [B93].

Various illustrative examples of the invention have been described in detail. In addition, however, many modifications and changes can be made to these examples without departing from the nature and spirit of the invention.

REFERENCES

[BBS98] Matt Blaze, Gerrit Bleumer, Martin Strauss: Divertible Protocols and Atomic Proxy Cryptography; Eurocrypt '98, LNCS 1403, Springer-Verlag, Berlin 1998, 127–144.

[B98] Gerrit Bleumer: Biometric yet Privacy Protecting Person Authentication; Information Hiding Workshop '98, LNCS 1525, Springer-Verlag, Berlin 1998, 101–112.

[B99] Gerrit Bleumer: Biometric Authentication and Multilateral Security; in Günter Müller, Kai Rannenberg (Eds.): Multilateral Security for Global Communication.

[BR93] Mihir Bellare, Phillip Rogaway: Random Oracles are Practical: A Paradigm for Designing Efficient Protocols; 1st ACM Conference on Computer and Communications Security, Proceedings, Fairfax, November 1993, ACM Press, New York 1993, 62–73.

[B93] Stefan Brands: An Efficient Off-line Electronic Cash System Based On The Representation Problem; Centrum voor Wiskunde en Informatica, Computer Science/Departement of Algorithms and Architecture, Report CS-R9323, March 1993.

[B94] Stefan Brands: Untraceable Off-line Cash in Wallet with Observers; Crypto '93, LNCS 773, Springer-Verlag, Berlin 1994, 302–318.

[BGK95] Ernest Brickell, Peter Gemmell, David Kravitz: Trustee-based racing Extensions to Anonymous Cash and the Making of Anonymous Change; 6$^{th}$ ACM-SIAM Symposium on Discrete Algorithms (SODA)1995, ACM Press, New York 1995, 457–466.

[BS96] Eric Bach, Jeffrey Shallit: Algorithmic Number Theory, Vol. 1; MI Press, Cambridge Mass. 1996.

[C83] David Chaum: Blind Signature System; Crypto '83, Plenum Press, New York 1984, 153.

[C84] David Chaum: A New Paradigm for Individuals in the Information Age; 1984 IEEE Symposium on Security and Privacy, IEEE Computer Society Press, Washington 1984, 99–103.

[C85] David Chaum: Security without Identification: Transaction Systems to make Big Brother Obsolete; Communications of the ACM 28/10 (1985)1030–1044.

[C88] David Chaum: Card-Computer Moderated Systems; U.S. Pat. No. 4,926,480, Date of patent 15 May 1990.

[C90] David Chaum: Showing credentials without identification: Transferring signatures between unconditionally unlinkable pseudonyms; Auscrypt '90, LNCS 453, Springer-Verlag, Berlin 1990, 246–264.

[CFN90] David Chaum, Amos Fiat, Moni Naor: Untraceable Electronic Cash; Crypto '88, LNCS 403, Springer-Verlag, Berlin 1990, 319–327.

[CP92] David Chaum, Torben Pryds Pedersen: Wallet Databases with Observers. Crypto '92, LNCS 740, Springer-Verlag, Berlin 1993, 89–105.

[CPS94] Jan L. Camenisch, Jean-Marc Piveteau, Markus A. Stadler: An Efficient Electronic Payment System Protecting Privacy; ESORICS 94 (Third European Symposium on Research in Computer Security), Brighton, LNCS 875, Springer-Verlag, Berlin 1994, 207–215.

[CPS95] Jan L. Camenisch, Jean-Marc Piveteau, Markus A. Stadler: Blind Signatures Based on the Discrete Logarithm Problem; Eurocrypt '94, LNCS 950, Springer-Verlag, Berlin 1995, 428–432.

[CPS96] Jan L. Camenisch, Jean-Marc Piveteau, Markus A. Stadler: An Efficient Fair Payment System; 3rd ACM Conference on Computer and Communications Security, New Delhi, India, March 1996, ACM Press, New York 1996, 88–94.

[EG85] Taher ElGamal: A Public Key Cryptosystem and a Signature Scheme Based on Discrete Logarithms; IEEE Transactions on Information Theory 31/4 (1985)469–472.

[F94] Niels Ferguson: Single Term Off-Line Coins; Eurocrypt '93, LNCS 765, Springer-Verlag, Berlin 1994, 318–328.

[FS87] Amos Fiat, Adi Shamir: How to Prove Yourself: Practical Solutions to Identification and Signature Problems; Crypto 86, LNCS 263, Springer-Verlag, Berlin 1987, 186–194.

[FY96] Yair Frankel, Yiannis Tsiounis, Moti Yung: "Indirect Discourse Proofs": Achieving Efficient Fair Off-Line E-cash; Asia crypt '96, LNCS 1163, Springer-Verlag, Berlin 1996, 286–300.

[FY93] Matthew Franklin, Moti Yung: Secure and Efficient Off-Line Digital Money; 20th International Colloquium on Automata, Languages and Programming (ICALP), LNCS 700, Springer-Verlag, Berlin 1993, 265–276.

[GMR88] Shafi Goldwasser, Silvio Micali, Ronald L. Rivest: A Digital Signature Scheme Secure Against Adaptive Chosen-Message Attacks; SIAM Journal on Computing 17/2 (1988)281–308.

[MOV97] Alfred J. Menezes, Paul C. van Oorschot, Scott A. Vanstone: Handbook of Applied Cryptography; CRC Press, Boca Raton 1997.

[NIS93] National Institute of Standards and Technology: Digital Signature Standard; Federal Information Processing Standards Publication (FIPS PUB xx), Feb. 1, 1993.

[O99] Andrew M. Odlyzko: Designs, Codes, and Cryptography (1999). To appear. http://www.research.att.com/amo/doc/complete.html

[PS97] David Pointcheval, Jacques Stern: Provably Secure Blind Signature Schemes; Asiacrypt '96, LNCS 1163, Springer-Verlag, Berlin 1996, 252–265.

[PS97a] David Pointcheval, Jacques Stern: New Blind Signatures Equivalent to Factorization; 4th ACM Conference on Computer and Communications Security, ACM-Press, New York 1997, 92–99.

[PS99] Birgit Pfitzmann, Ahmad-Reza Sadeghi: Coin-Based Anonymous Finger-printing; To appear at Eurocrypt '99, Springer-Verlag, Berlin 1999.

[RGV97] Cristian Radu, Ren Govaerts, Joos Vandewalle: Efficient electronic cash with restricted privacy; Financial Cryptography '97, Springer-Verlag, Berlin, 57–69.

[RGV96] C. Radu, R. Govaerts, J. Vandewalle: A Restrictive Blind Signature Scheme with Applications to Electronic Cash; 2nd IFIP Communications and Multimedia Security, Chapman &Hall, London 1996, 196–207.

[SPC95] Markus Stadler, Jean-Marc Piveteau, Jan Camenisch: Fair Blind Signatures; Eurocrypt '95, LNCS 921, Springer-Verlag, Berlin 1995, 209–219.

What is claimed is:

1. A multiple use ticket method, comprising:
providing a blind signature in a ticket, the signature having a multiple use; and
developing a blinding value for the signature in a reproducible computation using a seed key known to the issuer of the ticket, wherein said signature does not require an interactive signing protocol.

2. The method of claim 1, wherein said ticket is an electronic personal ticket.

3. The method of claim 1, wherein said ticket is an electronic season ticket.

4. The method of claim 1, wherein said ticket is an untraceable electronic personal ticket.

5. The method of claim 1, wherein said ticket is a personal license.

6. The method of claim 1, wherein said ticket is a personal driver's license.

7. The method of claim 1, wherein said ticket is an offline personal ticket.

8. A system for generating a multiple use ticket, comprising:
means for providing a blind signature in a ticket, the signature having a multiple use; and
means for developing a blinding value for the signature in a reproducible computation using a seed key known to the issuer of the ticket, wherein said signature does not require an interactive signing protocol.

9. An article of manufacture for a computer system, for providing a multiple use ticket, comprising:
a computer readable medium;
computer code in said computer readable medium for providing a blind signature in a ticket, the signature having a multiple use; and
computer code in said computer readable medium for providing a blinding value for the signature in a reproducible computation using a seed key known to the issuer of the ticket, wherein said signature does not require an interactive signing protocol.

* * * * *